United States Patent [19]
Hashiura et al.

[11] Patent Number: 5,148,862
[45] Date of Patent: Sep. 22, 1992

[54] HEAT EXCHANGER FIN MATERIALS AND HEAT EXCHANGERS PREPARED THEREFROM

[75] Inventors: Mitsuo Hashiura, Kenji Negura, Sadayuki Kamiya, Shigenori Yamauchi, Yuji Suzuki, Kenji Kato, Naoki Tokizane; Yoshifusa Shoji, all of Aichi, Japan

[73] Assignees: Sumitomo Light Metal Industries, Ltd., Tokyo; Nippondenso Co., Ltd., Kariya, both of Japan

[21] Appl. No.: 800,556

[22] Filed: Nov. 27, 1991

[30] Foreign Application Priority Data

Nov. 29, 1990 [JP] Japan ................. 2-326043
Nov. 29, 1990 [JP] Japan ................. 2-326044

[51] Int. Cl.$^5$ ............................ F28F 19/00
[52] U.S. Cl. ................. 165/134.1; 165/133; 165/180; 165/905; 428/544
[58] Field of Search ........... 165/133, 134.1, 180, 165/905; 428/544, 654; 228/183

[56] References Cited

U.S. PATENT DOCUMENTS

| | | | |
|---|---|---|---|
| 3,960,208 | 6/1976 | Anthony et al. | 165/1 |
| 4,203,490 | 5/1980 | Terai et al. | 165/134.1 |
| 4,317,484 | 3/1982 | Tanabe et al. | 165/134.1 |
| 4,410,036 | 10/1983 | Kanada et al. | 165/134.1 |
| 4,560,625 | 12/1985 | Kaify et al. | 428/654 |
| 4,991,647 | 2/1991 | Kawabe et al. | 165/134.1 |

FOREIGN PATENT DOCUMENTS

| | | | |
|---|---|---|---|
| 2-147163 | 6/1990 | Japan | 228/183 |
| 2-151379 | 6/1990 | Japan | 228/183 |
| 2-284762 | 11/1990 | Japan | 228/183 |

Primary Examiner—Allen J. Flanigan
Attorney, Agent, or Firm—Flynn, Thiel, Boutell & Tanis

[57] ABSTRACT

Disclosed herein are aluminum alloy fin materials useful for heat exchangers which consists of, in weight percentage, 0.8 to 1.8% Fe, 0.3 to 3.0% Zn, up to 0.3% Cu and at least one element selected from the group consisting of 0.05 to 0.25% Zr and 0.05 to 0.25% Cr, with the balance being Al and unavoidable impurities, wherein Mn in the unavoidable impurities is 0.3% or less. The fin material being characterized, after brazing, by its superior thermal conductivity and beneficial sacrificial anode effect. The fin material is also suitable as a core of a brazing fin material in combination with an Al-Si alloy brazing material in which the Al-Si alloy brazing material is clad as an outer cladding layer onto both sides of the core. The above unclad or clad fin materials can provide heat exchangers having high corrosion resistance and good heat transfer characteristics in combination with a fluid passage material made of brazing sheet or an extruded tube of pure aluminum or an aluminum alloy with not more than 0.5% Cu and/or not more than 0.5% Mn.

7 Claims, 2 Drawing Sheets

HEAT EXCHANGER FIN MATERIALS AND HEAT EXCHANGERS PREPARED THEREFROM

BACKGROUND OF THE INVENTION

1. Field of the Invention

The present invention relates to aluminum heat exchanges used in condensers and evaporators of automobile air conditioners, radiators, intercoolers, oil coolers, etc, in which a fin member and a working fluid passage member are bonded together by brazing, and further relates to aluminum alloy fin materials suitable for use in such aluminum heat exchangers. More specifically, the present invention relates to aluminum heat exchangers having excellent corrosion resistance and heat transfer characteristics and to aluminum alloy fin materials for such heat exchangers which have a superior combination of properties of high thermal conductivity and beneficial sacrificial anode effect after brazing.

2. Description of the Prior Art

In heat exchangers used in condensers and evaporators for automobile air conditioners, radiators, heaters, intercoolers, oil coolers and so forth, an aluminum alloy material constituting a working fluid passage member and an aluminum alloy material constituting a fin member are bonded together by brazing in which a brazing material is placed either on the fluid passage member or on the fin member. When the brazing material is placed on the fluid passage member, a bare fin material is used as the fin member and a composite material consisting of a core made of an aluminum alloy and a cladding layer made of an Al-Si alloy brazing filler material, which is applied onto one side or both sides of the core is used as the liquid passage material. When the brazing material is placed on the fin member, an extruded tube is used as the liquid passage material and a composite material consisting of a core made of an aluminum alloy and a cladding layer made of an Al-Si alloy brazing filler material, which is applied onto both sides of the core, is used as the fin member.

As the core material of the composite for the liquid passage material, Al-Mn alloys have been employed. As the material for the extruded tube, pure aluminum, for example, AA 1050, 1070 or 1100, or aluminum alloys containing up to about 0.5% Cu or Mn have been employed. The AA designation and number of aluminum alloys in the specification are those of the U.S. Aluminum Association.

The fin material is required to have a sacrificial anode effect to protect the foregoing liquid passage material or the foregoing extruded tube from corrosion as well as a good high-temperature buckling resistance sufficient to prevent the problems of deformation and erosion attack by the brazing filler material which may arise during brazing. Since the addition of Mn is effective for preventing the deformation and erosion attack by the brazing filler material, Al-Mn alloys, such as AA 3003 alloy or AA 3203 alloy, have been employed as the fin material or, when the fin material is constituted by a brazing sheet, as the core of such a brazing fin material.

Addition of Zn, Sn, In, etc., to the Al-Mn alloy fin material has been proposed to make the fin material electrochemically anodic to the fluid passage material and, thereby, provide a sacrificial anode property to the fin material. (Refer to Japanese Patent Publication No. 56-12395 and Japanese Patent Laid-Open No. 62-120455). Further, in order to obtain an improved buckling resistance (sagging resistance) at high temperatures, the addition of Cr, Ti, Zr and so on has been proposed in Japanese Patent Application Laid-Open Nos. 50-118919 and 54-61354). Heat exchangers fabricated from a combination of the foregoing extruded tube and fin members are, for example, described in Japanese Patent Publication No. 59-52760.

Further, applicants have previously proposed a heat exchanger fin material having a high strength and superior heat transfer properties which were achieved by an increased Fe addition without an accompanying addition of Mn. (Refer to Japanese Patent Application No. 1-218648.)

When the extruded tube material of the pure aluminum and the fin material of the Al-Mn alloy containing Zn, Sn, In, etc., are, as set forth above, combined, a certain extent of corrosion prevention can be expected in the tube material by the sacrificial anode effect of the fin material, but the corrosion prevention distance (i.e., the range in which the sacrificial anode effect of the fin material occurs) is short, since the potential difference between the tube material and fin material is insufficiently large. Consequently, there is the problem that the tube material is susceptible to pitting corrosion in the parts away from the fin material. Alternatively, when the extruded tube is made of the alloys containing Cu or Mn instead of the pure aluminum extruded tube, the electrochemical potential of the tube becomes noble and the potential difference between the tube and fin also becomes large. Consequently, the corrosion prevention range becomes wider. However, when the addition of Cu or Mn to the tube is increased, the extrudability of the tube, especially with regard to multivoid tubes, is deleteriously decreased. Therefore, the addition of Cu or Mn should be limited to up to 0.5% and the satisfactory solution to the above problem has not been achieved.

Recently, zinc-coated tubes have been increasingly employed as the material constituting the fluid passages in which the tubes are protected from corrosion by a Zn-diffusion zone formed during brazing. When such tubes are combined with the conventional fins made of, for example, the foregoing Al-Mn alloy with Zn, Sn, In, etc., by brazing, the formed Zn-diffusion zone corrodes in preference to the fins during service, because the Zn-diffusion zone has a greater anodic potential than the fins. Therefore, there is a problem of separation of the fins from the tubes.

Further, in recent years, there has been a strong demand for weight-reduction and cost-saving of heat exchangers. In order to respond to such a demand, it is necessary to reduce the thickness of the structural materials (e.g., working fluid passage material, fin material or the like) used in heat exchangers. However, when the thickness of the fin material is reduced, the cross section through which heat flux transfers is also reduced and serious problems will arise in the heat-transfer efficiency.

In order to eliminate these problems, it is desired that the fins after brazing have a high thermal conductivity. However., in the case of using the Al-Mn alloy as the fin material or as the core of the brazing fin material, Mn in solid solution increases due to the dissolution of Al-Mn compounds during the brazing operation, thereby resulting in a considerable reduction of the thermal conductivity. Further, in order to increase the thermal conductivity of the fin material, attempts have been made to use fin materials made of pure aluminum (such as AA 1050, AA 1070 or the like) with the addition of Zn, Sn, In, Cr, Ti, Zr or the like. However, such fin materials have a poor buckling resistance at high temperatures and their strength is reduced after brazing, although they have a high thermal-conductivity. Consequently, the fins constituted by such materials are apt to fall and the foregoing problems have not been substantially eliminated.

SUMMARY OF THE INVENTION

Accordingly, an object of the present invention is to provide a fundamental solution to the problems as mentioned above.

The present inventors have made many studies on various aluminum alloys and found an aluminum alloy fin material which has a greatly improved thermal conductivity after brazing, together with high strength, superior sacrificial anode effect and good high-temperature buckling resistance, as compared with fin materials made of the above-mentioned conventional Al-Mn alloy. Further, it has been found that a further improved brazing fin material can be obtained when the aluminum alloy fin material is clad with an Al-Si alloy brazing material at both sides thereof. These unclad or clad fin materials provide heat exchangers having high corrosion resistance and superior heat transfer ability when combined with the liquid passage materials or the extruded tubes made of pure aluminum or an aluminum alloy containing Cu or Mn. The extruded tubes may be covered with Zn. The present invention has been achieved based on such findings. The present invention is as follows. In the specification, the percentages (%) of contents of the respective aluminum alloy compositions are represented by weight percent, unless otherwise indicated.

(1) An aluminum alloy fin material for use in an aluminum heat exchanger, which consists of 0.8 to 1.8% Fe, 0.3 to 3.0% Zn, up to 0.3% Cu and at least one element selected from the group consisting of 0.05 to 0.25% Zr and 0.05 to 0.25% Cr, with the balance being Al and unavoidable impurities, with the Mn content in the unavoidable impurities being 0.3% or less. The fin material has superior thermal conductivity and sacrificial anode effect after being brazed.

(2) A brazing fin material for use in an aluminum heat exchanger, which consists of an aluminum alloy core consisting of 0.8 to 1.8% Fe, 0.3 to 3.0% Zn, up to 0.3% Cu and at least one element selected from the group consisting of 0.05 to 0.25% Zr and 0.05 to 0.25% Cr, with the balance being Al and unavoidable impurities, with the Mn content in the unavoidable impurities being 0.3% or less; and a cladding consisting of an Al-Si alloy brazing material clad onto both sides of the core. The brazing fin material has superior thermal conductivity and sacrificial anode effect after being brazed.

(3) A heat exchanger having excellent corrosion resistance and heat transfer properties, which comprises:

(i) a fin member made of an aluminum alloy consisting of 0.8 to 1.8% Fe, 0.3 to 3.0% Zn, up to 0.3% Cu and at least one element selected from the group consisting of 0.05 to 0.25% Zr and 0.05 to 0.25% Cr, with the balance being Al and unavoidable impurities, with the Mn content in the unavoidable impurities being 0.3% or less; and (ii) a fluid passage member made of a brazing sheet consisting of an aluminum alloy core and a cladding made of an Al-Si brazing alloy and bonded onto one side or both sides of the core, wherein the fin member is brazed to the fluid passage member.

(4) A heat exchanger having excellent corrosion resistance and heat transfer properties, which comprises:

(i) a fin member made of a brazing sheet consisting of an aluminum alloy core and a cladding made of an Al-Si brazing alloy bonded onto both sides of the core, the aluminum alloy core consisting of 0.8 to 1.8% Fe, 0.3 to 3.0% Zn and up to 0.3% Cu and at least one element selected from the group consisting of 0.05 to 0.25% Zr and 0.05 to 0.25% Cr, with the balance being essentially Al and unavoidable impurities, with the Mn content in the unavoidable impurities being 0 3% or less; and (ii) a fluid passage member made of an extruded tube consisting of an aluminum having an aluminum purity of 99% or more, wherein the fin member is brazed to the fluid passage member.

(5) A heat exchanger having excellent corrosion resistance and heat transfer properties, which comprises:

(i) a fin member made of a brazing sheet consisting of an aluminum alloy core and a cladding made of an Al-Si brazing alloy and bonded onto both sides of the core, the aluminum alloy core consisting of 0.8 to 1.8% Fe, 0.3 to 3.0% Zn and up to 0.3% Cu and at least one element selected from the group consisting of 0.05 to 0.25% Zr and 0.05 to 0.25% Cr, with the balance being essentially Al and unavoidable impurities, with the Mn content in the unavoidable impurities being 0.3% or less; and (ii) a fluid passage member made of an extruded tube consisting of an aluminum alloy consisting of at least one element selected from the group consisting of not more than 0.5% Cu and not more than 0.5% Mn, with the balance being essentially Al and unavoidable impurities, wherein the fin member is brazed to the fluid passage member.

As a further aspect of the present invention, the extruded tube made of the above-specified aluminum alloys and constituting the fluid passage member in the heat exchangers (4) and (5) may have a Zn coating layer of 1 to 25 g/m$^2$ on the surface thereof.

DETAILED DESCRIPTION OF THE PREFERRED EMBODIMENTS

Figures 1A, 1B:
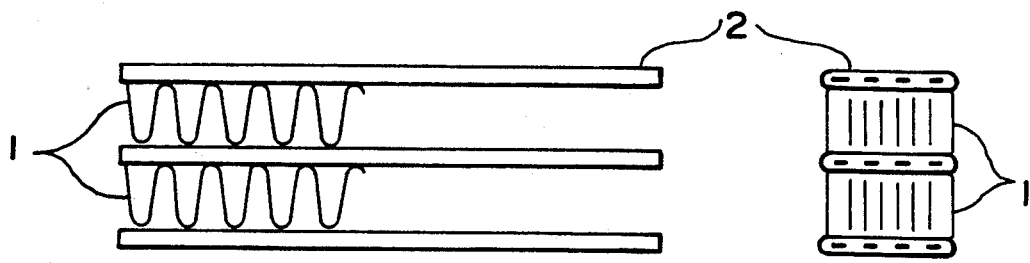
FIG. 1(A) is a front view illustrating a test sample prepared to examine the effects of the present invention and FIG. 1(B) is an end view thereof.

The respective alloy compositions used in the present invention are limited as above for the following reasons.

(1) Aluminum alloy fin materials or the core material of brazing fin materials:

Fe: Fe imparts an improved strength to the fin member not only before brazing but also after brazing. Since no Mn is added to the alloy of the present invention, 0.8% or more of Fe is required to obtain an improved strength. The strength of the alloy is increased with an increase in the Fe content and, thus, at least 1.0% Fe is preferable. However, when the Fe content in the alloy exceeds 1.8%, coarse compounds of Al-Fe eutectic products are formed during the casting process and it becomes difficult to process the fin material into a sheet form.

Since, unlike Mn, Fe does not dissolve as much into solution during the brazing operation, it neither reduces the thermal conductivity nor renders the potential of the fin material cathodic (noble) to the passage material. Therefore, Fe exerts advantageous effects on the thermal, conductivity and sacrificial anode properties, especially, in the above-mentioned Zn-coated tube, and, thus, Fe is a desirable additive for the fin material.

Zn: Zn renders the potential of the fin material anodic (less-noble) to the tube material, thereby providing a sacrificial anode effect. Especially, when Zn is added to Al-Fe system alloys, the potential of the fin material is effectively less-noble. Specifically, the Zn addition broadens the effective distance of corrosion prevention (i.e., the range in which the sacrificial anode effect of the fin material occurs), when the fin material is used in combination with the uncoated tubes. Alternatively, in combination with the Zn-coated tubes, the fin material also shows improved sacrificial anode effect in the Zn-diffusion zone. When the Zn addition is below the above prescribed lower limit, the above effect is insufficient. On the other hand, an excessive addition exceeding its upper limit detrimentally lowers the self-corrosion resistance of the fin material. When the fin material has no outer cladding layer, the Zn content is preferably not greater than 2.0%, because a Zn content exceeding 2.0% produces no further significant effect and tends to reduce the self-corrosion resistance of the fin.

Cu: Cu improves the strength after brazing. An excessive addition of Cu exceeding its upper limit renders the potential of the fin member noble, thereby detrimentally affecting the sacrificial anode property.

Zr and Cr: Zr and Cr provide an improved high-temperature buckling resistance. When Zr and Cr are added in amounts below their lower limits, the effect is not sufficient. An excessive addition exceeding their upper limits results in a reduction of the thermal conductivity after brazing.

Mn: As set forth above, when the amount of Mn as an impurity becomes large, the thermal conductivity of the fin member is reduced and the electrochemical potential of the same becomes noble. Therefore, that the Mn content should be as small as possible. Usually, up to 0.3% Mn is acceptable but, when especially high thermal conductivity is required, 0.1% or less Mn is preferable.

Other elements, such as Si, Mg, Ti, etc., are acceptable, as long as they do not provide any detrimental effect to the alloy material of the present invention. Since unacceptably high contents of these elements result in a reduction of the thermal conductivity, it is desirable that Si, Mg and Ti be not more than 0.6%, not more than 0.2% and not more than 0.05%, respectively. When brazing is conducted using a fluoride flux, Mg reacts with the flux. Therefore, it is preferable to suppress the Mg content to a further low level, i.e., 0.1% or less. Ti may be added as an alloying element for its grain-refinement effect or as a grain-refining agent of Al-Ti-B when casting. However, the amount of Ti should be within the above-specified range. Brazing material:

As the brazing material, Al-Si alloys, typically containing 6 to 13% Si, are employed. Si contained in the brazing material partly enters the core material due to the diffusion (solid-diffusion) during the brazing operation therein, thereby improving its strength. Further, in order to enhance the sacrificial anode effect of the fin material as a whole, Zn may be added to the brazing material (2) Fluid passage material and extruded tube material:

A brazing sheet consisting of an aluminum alloy core and an Al-Si brazing alloy bonded onto one side or both sides of the core is used as the fluid passage material. Aluminum alloys for the core may be Al-Mn, Al-Mn-Cu, or Al-Mn-Cu-Mg alloys.

When the above fluid passage materials are combined with the fin materials as previously described, heat exchangers with a superior corrosion resistance and a superior heat-transfer efficiency can be obtained.

Pure aluminum of at least 99% or an aluminum alloy consisting of at least one element selected from the group consisting of not more than 0.5% Cu and not more than 0.5% Mn, with the balance being essentially Al and unavoidable impurities, are used as the extruded tube material. When the purity of the former is less than 99%, the corrosion resistance is unfavorably reduced. Usually, industrial pure aluminum, such as AA 1050, AA 1070, AA 1100, etc., may be employed. On the other hand, in the latter tube material, Cu and Mn make the potential of the tube material noble so as to increase the potential difference between the tube material and the fin material, thereby enhancing the corrosion prevention action due to the sacrificial anode effect of the fin material. These elements are added for such effects. Although the effect is enhanced by increasing the amounts of Cu and Mn, an excessive addition of Cu and Mn, each in an amount of more than 0.5%, leads to a reduction of the extrudability of the tubes, especially, extruded multivoid tubes.

When the above tubes (uncoated tubes) are combined with the brazing fin materials as previously described, the corrosion-prevention distance is substantially broadened and superior corrosion-resistant heat exchangers can be obtained. Needless to say, the thus obtained heat exchangers have a superior heat-transfer efficiency.

Also, the above tube material may be coated with Zn. In this case, a Zn-diffusion zone is formed during the brazing operation and the tube materials are protected from corrosion. The coating amount of Zn is preferably in the range of 1 to 25 $g/m^2$. When the coating amount is less than 1 $g/m^2$, a sufficient corrosion prevention effect can not be obtained. On the other hand, when the Zn amount exceeds 25 $g/m^2$, the Zn concentration becomes too high at the surface region of the tube material due to the diffusion of Zn and corrosion rapidly occurs in the Zn diffusion zone, thereby causing separation of the fins from the surface of the tubes. Spray coating, plating or other similar coating methods can be employed to apply Zn onto the tube material.

When thus Zn-coated tubes are combined with the above-prescribed brazing fin materials of the present invention, superior heat exchangers having a good corrosion resistance and free from the separation problem of the fin member can be obtained. The heat exchanger also have a superior heat transfer efficiency.

EXAMPLE 1

15 kinds of alloys, as shown in Table 1, were each melted, cast and homogenized. Each homogenized alloy was subjected to hot rolling, cold rolling, intermediate annealing and final cold-rolling treatments. Thus, fin materials with a thickness of 0.07 mm were obtained. The thus obtained fin materials were heated under the same conditions as in brazing, i.e., at 600° C. for 3 minutes in a nitrogen gas atmosphere. The fin materials were then measured for their tensile strength and electrical conductivity. Also, the fin materials were immersed in a 3% aqueous solution of NaCl, adjusted at a pH of 3, for 8 hours and their spontaneous electrode potentials were measured. Generally, the thermal conductivity and electrical conductivity of metal are in proportion and, thus in the Examples, the electrical conductivity measurements were conducted at 25° C. instead of the thermal conductivity measurements. The fin materials were formed into corrugated fins and placed on a brazing sheet consisting of a core of AA 3003 alloy and a cladding of AA 4045 alloy (brazing material). Both members were brazed using a fluoride flux to examine their brazability. A CASS test (JIS D0201) was conducted on the brazed joint section between the fin material and the sheet for a month and the maximum corrosion depth of the brazing sheet and the corrosion state of the fin material were evaluated.

The test results are given in Table 2. Sample Nos. A1 to A5 of the present invention exhibited a high tensile strength of at least 8.4 kgf/mm$^2$ and a high electrical conductivity of at least 50%. Further, these samples of the present invention had a superior brazability and showed a small maximum corrosion depth of 0.06 to 0.07 mm and a superior sacrificial anode effect due to their less-noble spontaneous electrode potentials of not more than -770 mV vs SCE.

Comparative Sample No. A6 had a low tensile strength, because the Fe content was insufficient. No. A7 could not provide a sound fin material, because the Fe content was excessive. Further, the strengthening effect of Fe was maximized and any further improvement could not be produced by the excessive Fe addition. No. A8 was subjected to erosion attack by the brazing material because of its low Zr content and buckled during the brazing. Nos. A9 and A10 had a low electrical conductivity because the Zr or Cr content was too high. No. A11 had a noble spontaneous electrode potential of -710 mV vs SCE because the Zn content was inadequate. Therefore, the sacrificial anode effect of the fin material was inadequate and the maximum corrosion depth of the brazing sheet reached 0.50 mm. No. A12 had an inferior self-corrosion resistance because of the too high Zn content. Therefore, No. A12 was subjected to a considerably excessive corrosion.

No. A13 had a noble spontaneous electrode potential of -720 mV vs SCE because the Cu content was too high. Further, the brazing sheet plate showed a large maximum corrosion depth of 0.43 mm and the sacrificial anode effect of the fin material was not sufficient. No. A14 is an AA 3003 alloy with the addition of Mn and Cu and has heretofore been used as a fin material. Its low electrical conductivity of 38% IACS shows that this comparative sample has a low thermal conductivity. Further, No. A14 had a noble spontaneous electrode potential of -700 mV vs SCE and a large maximum corrosion depth of 0.46 mm. Accordingly, the sacrificial anode effect was insufficient. No. A15 is an AA 3203 alloy containing 1.4% Mn. This alloy material showed almost the same properties as No. A14.

TABLE 1

| Sample No. | Al | Fe | Zr | Cr | Zn | Cu | Mn |
|---|---|---|---|---|---|---|---|
| A1 | bal. | 0.9 | 0.12 | — | 1.5 | 0.15 | — |
| A2 | bal. | 1.3 | — | 0.13 | 1.0 | 0.05 | 0.04 |
| A3 | bal. | 1.6 | 0.06 | 0.06 | 1.7 | 0.24 | 0.21 |
| A4 | bal. | 1.4 | 0.23 | — | 0.5 | 0.07 | — |
| A5 | bal. | 1.2 | — | 0.22 | 1.0 | 0.20 | — |
| A6 | bal. | 0.6* | 0.10 | — | 1.3 | 0.15 | — |
| A7 | bal. | 2.1* | — | 0.13 | 1.5 | 0.15 | — |
| A8 | bal. | 1.3 | 0.02* | — | 1.5 | 0.16 | — |
| A9 | bal. | 1.3 | 0.30* | — | 1.5 | 0.15 | — |
| A10 | bal. | 1.3 | — | 0.30 | 1.5 | 0.15 | — |
| A11 | bal. | 1.3 | — | 0.11 | 0.1* | 0.15 | — |
| A12 | bal. | 1.3 | 0.11 | — | 3.2* | 0.15 | — |
| A13 | bal. | 1.3 | 0.11 | — | 1.0 | 0.40* | — |
| A14 | bal. | 0.6* | — | — | — | 0.15 | 1.1* |
| A15 | bal. | 0.5* | — | — | — | — | 1.4* |

Remark:
Nos. A1-A5: Samples of the Present Invention
Nos. A6-A15: Comparative Samples
*Contents outside the ranges of the Present Invention

TABLE 2

| Sample No. | Tensile Strength (kgf/mm$^2$) | Electrical Conductivity (% IACS) | Brazability | Spontaneous Electrode Potential mV vs SCE | Maximum Corrosion Depth of Brazing-sheet (mm) | Corrosion State of Fin** |
|---|---|---|---|---|---|---|
| A1 | 8.4 | 53 | good | -780 | 0.07 | o |
| A2 | 8.9 | 54 | good | -800 | 0.06 | o |
| A3 | 9.4 | 50 | good | -770 | 0.07 | o |
| A4 | 9.0 | 54 | good | -770 | 0.06 | o |
| A5 | 9.1 | 51 | good | -780 | 0.06 | o |
| A6 | 7.2 | 53 | good | -770 | 0.06 | o |
| A7 | 9.0 | 53 | good | -780 | 0.07 | o |
| A8 | 8.8 | 55 | poor (erosion by brazing material) | -780 | 0.06 | o |
| A9 | 9.0 | 43 | good | -770 | 0.07 | o |
| A10 | 8.8 | 43 | good | -770 | 0.07 | o |
| A11 | 8.8 | 53 | good | -710 | 0.50 | o |
| A12 | 8.8 | 53 | good | -810 | 0.06 | x |
| A13 | 9.2 | 51 | good | -720 | 0.43 | o |
| A14 | 10.2 | 38 | good | -700 | 0.46 | o |
| A15 | 10.4 | 38 | good | -710 | 0.40 | o |

Remark:
Nos. A1-A5: Samples of the Present Invention
Nos. A6-A15: Comparative Samples
*No. A7 was measured only at the sound part for the purpose of comparison, because it was not a sound fin material as a whole.
** : No serious corrosion was observed
x: Considerable corrosion was observed

EXAMPLE 2

The fin materials prepared in Example 1 were formed into corrugated fins and combined with the welded tubes made of the brazing sheet consisting of an AA3003 core, AA4045 outer cladding (brazing material) and AA7072 inner cladding, by brazing employing a fluoride flux to assemble the radiators. Each of the thus assembled radiators was tested for its heat transfer efficiency and subjected to a four-week CASS test (JIS D0201) to examine the maximum corrosion depth on the tube outer surface. The test results are set out in Table 3. Sample numbers correspond to those of the used fin materials as shown in Table 1.

Sample Nos. A1 to A5 of the present invention showed an increased heat transfer efficiency as compared with Comparative Sample No. A15, which was prepared from a conventional fin and tube combination. Further, the samples of the present invention showed small maximum corrosion depths.

Comparative Samples Nos. A9 and A10 showed a small augmentation because the fin materials used in these samples had a low thermal conductivity. No. A15 showed a large maximum corrosion depth because the fin material was made of conventional AA3203 alloy.

TABLE 3

| Sample No. | Augmentation in Heat Transfer Rate* | Maximum Corrosion Depth (mm) |
| --- | --- | --- |
| A1 | 4 | 0.06 |
| A2 | 4 | 0.07 |
| A3 | 3 | 0.06 |
| A4 | 4 | 0.06 |
| A5 | 3 | 0.07 |
| A9 | 1 | 0.07 |
| A10 | 1 | 0.06 |
| A15 | 0 | 0.38 |

Remark:
Nos. A1–A5: Samples of the Present Invention
Nos. A9, A10, A15: Comparative Samples
*Augmentation (%) in heat transfer rate is shown based on the rate of heat transfer of Comparative Sample No. A15.

EXAMPLE 3

Core alloys A to P, as shown in Table 4, and a brazing alloy AA 4343 (Al-7.5% Si) were each melted and cast. Each core alloy ingot was homogenized and the brazing alloy was hot rolled. The homogenized core alloy was clad with the previously hot-rolled brazing alloy on both sides thereof and hot-rolled together. Thereafter, the clad material was subjected to cold rolling, intermediate annealing, and final rolling treatments. There was obtained brazing fin material Nos. B1 to B16, as shown in Table 4, with a total thickness of 0.12 mm. (total cladding ratio on both sides of the core: 10%) The thus obtained brazing fin materials were heated at 600° C. for 3 minutes in a nitrogen gas atmosphere, as in brazing. The brazing fin materials were then measured for their tensile strength and electrical conductivity. Also, the brazing fin materials were immersed in a 3% aqueous solution of NaCl (pH=3) for 8 hours and their spontaneous electrode potentials were measured. As described, in Example 1, electrical conductivity measurements were conducted at 25° C. instead of thermal conductivity measurements. The state of erosion attack by the brazing material in the core material was examined by metallographical observation for the cut section of the core material and its brazability was judged.

The test results are given in Table 5. Sample Nos. B1 to B5 of the present invention exhibited high tensile strength and electrical conductivity after being subjected to a heat treatment which was equivalent to a brazing treatment, in comparison with a conventional fin material No. B16. Further, these samples of the present invention had a superior brazability and a superior sacrificial anode effect due to their less-noble spontaneous electrode potentials, as compared with the conventional fin material No. B16.

Comparative Sample No. B6 had a low tensile strength because the Fe content of the core material was insufficient. On the other hand, No. B7 could not provide a sound fin material because the Fe content was excessive.

The spontaneous electrode potential of No. B8 was somewhat noble because the Zn content in the core material was low. No. B9 had a somewhat low electrical conductivity because the Zn content was too high.

No. B10 showed a somewhat low tensile strength because Cu was not contained in the core material.

The spontaneous electrode potential of No. B11 was electrochemically noble because an excessive amount of Cu was present in the core material.

No. B12 had a poor brazability, because Zr and Cr were insufficiently included in the core material.

Nos. B13 and B14 had a low electrical conductivity because the content of Zr or Cr was excessive.

The spontaneous electrode potential of No. B15 was somewhat noble and the electric conductivity was low because a large amount of Mn was contained in the core material.

No. B16 is a conventional fin material using a core made of AA 3003 with Zn. This comparative sample had a somewhat low tensile strength, a low electrical conductivity and a somewhat noble spontaneous electrode potential.

TABLE 4

| No. | Al | Fe | Zn | Cu | Zr | Cr | Mn |
| --- | --- | --- | --- | --- | --- | --- | --- |
| A | bal | 0.9 | 1.5 | 0.15 | 0.22 | — | 0.26 |
| B | bal | 1.2 | 0.5 | 0.04 | — | 0.15 | 0.15 |
| C | bal | 1.8 | 2.0 | 0.26 | 0.06 | 0.07 | 0.04 |
| D | bal | 1.2 | 2.5 | 0.15 | 0.15 | — | — |
| E | bal | 1.4 | 1.5 | 0.07 | — | 0.22 | — |
| F | bal | 0.6* | 1.5 | 0.10 | 0.10 | — | — |
| G | bal | 2.3* | 1.5 | 0.15 | — | 0.10 | 0.05 |
| H | bal | 1.2 | 0.1* | 0.20 | 0.15 | — | 0.15 |
| I | bal | 1.2 | 3.5* | 0.15 | 0.15 | — | — |
| J | bal | 1.2 | 1.5 | — | 0.15 | — | — |
| K | bal | 1.2 | 1.0 | 0.42* | — | 0.17 | 0.20 |
| L | bal | 1.3 | 1.0 | 0.10 | 0.02* | 0.01* | — |
| M | bal | 1.3 | 2.0 | 0.20 | 0.30* | — | 0.10 |
| N | bal | 1.3 | 2.0 | 0.20 | — | 0.32* | 0.10 |
| O | bal | 1.2 | 1.5 | 0.15 | — | 0.15 | 0.50* |
| P** | bal | 0.6* | 1.5 | 0.15 | — | — | 1.2* |

Remark:
*Contents outside the ranges of the present invention
**3003 alloy with Zn

TABLE 5

| Sample No. | Core alloy | Tensile Strength (MPa) | Tensile Strength (kgf/mm²) | Electrical Conductivity (% IACS) | Brazability | Spontaneous Electrode Potential (mV vs SCE) |
| --- | --- | --- | --- | --- | --- | --- |
| B1 | A | 127 | 13 | 47 | Good | −760 |

TABLE 5-continued

| Sample No. | Core alloy | Tensile Strength (MPa) | Tensile Strength (kgf/mm²) | Electrical Conductivity (% IACS) | Brazability | Spontaneous Electrode Potential (mV vs SCE) |
| --- | --- | --- | --- | --- | --- | --- |
| B2 | B | 127 | 13 | 49 | Good | −750 |
| B3 | C | 137 | 14 | 46 | Good | −785 |
| B4 | D | 127 | 13 | 44 | Good | −800 |
| B5 | E | 127 | 13 | 45 | Good | −760 |
| B6 | F | 98 | 10 | 47 | Good | −760 |
| B7 | G | — | — | — | — | — |
| B8 | H | 127 | 13 | 48 | Good | −725 |
| B9 | I | 127 | 13 | 42 | Good | −840 |
| B10 | J | 118 | 12 | 45 | Good | −765 |
| B11 | K | 137 | 14 | 45 | Good | −710 |
| B12 | L | — | — | — | Poor (Erosion) | — |
| B13 | M | 127 | 13 | 41 | Good | −775 |
| B14 | N | 127 | 13 | 41 | Good | −770 |
| B15 | O | 127 | 13 | 41 | Good | −730 |
| B16 | P | 108 | 11 | 40 | Good | −725 |

Remark:
Nos. B1-B5: Brazing Fin Materials of the Present Invention
Nos. B6-B16: Comparative Brazing Fin Materials

EXAMPLE 4

The brazing fin materials prepared in Example 3 were formed into corrugated fins and bonded to extruded tubes, which were made of Al-0.4 Cu-0.1 Mn and coated with Zn by spray coating (Zn coating amount: 10 g/m²), by brazing employing a fluoride flux to prepare test samples, as shown in FIGS. 1(A) and 1(B). In FIGS. 1(A) and 1(B), the fins and tubes are represented by reference numerals 1 and 2, respectively. Each sample was subjected to a four-week CASS test (JIS D 0201) and a four-week salt spray test (JIS Z 2371) to examine the maximum corrosion depth on the tube outer surface, the corrosion state in the fin material and the separation of the fin from the tube. The test results are set out in Table 6.

Sample Nos. B1 to B5 of the present invention showed small maximum corrosion depths and no substantial corrosion state was detected. No separation problem arose in these fins Nos. B1 to B5.

In comparative Sample Nos. B6 to B16, their maximum corrosion depth was small because the tube was coated with Zn. However, in Nos. B8, B11, B15 and B16, the fin members separated from the tubes. Further, a considerable corrosion occurred in Sample No. B9.

TABLE 6

| Sample No. | Core Alloy of Fin | CASS TEST Maximum Corrosion Depth (mm) | CASS TEST Corrosion State of Fin* | Salt Spray Corrosion Test Maximum Corrosion Depth (mm) | Salt Spray Corrosion Test Corrosion State of Fin* | Separation of brazed Fin |
| --- | --- | --- | --- | --- | --- | --- |
| B1 | A | 0.07 | c | 0.04 | c | No separation |
| B2 | B | 0.06 | c | 0.03 | c | No separation |
| B3 | C | 0.06 | c | 0.03 | o | No separation |
| B4 | D | 0.05 | c | 0.04 | c | No separation |
| B5 | E | 0.06 | o | 0.04 | o | No separation |
| B6 | F | 0.07 | o | 0.04 | c | No separation |
| B7 | G | — | — | — | — | — |
| B8 | H | 0.07 | c | 0.04 | c | Separation |
| B9 | I | 0.06 | x | 0.03 | x | No separation |
| B10 | J | 0.07 | c | 0.03 | c | No separation |
| B11 | K | 0.07 | c | 0.04 | c | Separation |
| B12 | L | — | — | — | — | — |
| B13 | M | 0.06 | o | 0.04 | c | No separation |
| B14 | N | 0.06 | o | 0.03 | o | No separation |
| B15 | O | 0.07 | c | 0.04 | c | Separation |
| B16 | P | 0.07 | o | 0.04 | c | Separation |

Remark:
Nos. B1-B5: Brazing Fin Materials of the Present Invention
Nos. B6-B16: Comparative Brazing Fin Materials
* : No significant corrosion occurred.
x: Considerable corrosion occurred.

EXAMPLE 5

The brazing fin materials prepared in Example 3 were formed into corrugated fins and bonded to extruded tubes made of Al-0.4 Cu-0.1 Mn by brazing using a fluoride flux to prepare test samples, as shown in FIGS. 1(A) and 1(B). In FIGS. 1(A) and 1(B), the fins and tubes are represented by reference numerals 1 and 2, respectively. Each of the samples thus prepared was subjected to a four-week SWATT test (ASTM G 43) and examined for the maximum corrosion depth on the tube outer surface at the brazed joint portion of the tube and the fin, the corrosion-prevention distance i.e., the shortest distance from the brazed joint portion of the fin to a deeply corroded point in the unbrazed portion of the fin, and the corrosion state in the fin. The results are set forth in Table 7.

TABLE 7

| Sample No. | Core Alloy of Fin | SWATT TEST | | |
|---|---|---|---|---|
| | | Maximum Corrosion Depth (mm) | Corrosion Prevention Distance (mm) | Corrosion State of Fin* |
| B1 | A | 0.03 | 7 | c |
| B2 | B | 0.02 | 7 | c |
| B3 | C | 0.01 | 8 | c |
| B4 | D | 0.01 | 8 | c |
| B5 | E | 0.02 | 7 | c |
| B6 | F | 0.02 | 7 | c |
| B7 | G | — | — | — |
| B8 | H | 0.13 | 3 | o |
| B9 | I | 0.02 | 9 | x |
| B10 | J | 0.03 | 8 | o |
| B11 | K | 0.25 | 2 | o |
| B12 | L | — | — | — |
| B13 | M | 0.03 | 7 | o |
| B14 | N | 0.02 | 6 | o |
| B15 | O | 0.03 | 4 | o |
| B16 | P | 0.04 | 3 | o |

Remark:
Nos. B1–B5: Samples of Present Invention
Nos. B6–B16: Comparative Samples
* : No serious corrosion occurred.
x: Considerable corrosion occurred.

Sample Nos. B1 to B5 according to the present invention showed a small maximum corrosion depth and a long corrosion prevention distance and the corrosion state of the fin did not present any problem.

In Comparative Sample Nos. B6 to B16, No. B8 showed a large maximum corrosion depth and an insufficient corrosion-prevention distance because the Zn content was insufficient. No. B9 showed an excessive corrosion of the fin because the Zn content was too high. No. B11 showed a large maximum corrosion depth and an inadequate corrosion-prevention distance because the Cu content was too high. No. B15 showed an insufficient corrosion-prevention distance because the Mn content was excessive. The conventional fin material, Sample No. B16, showed a short corrosion-prevention distance.

EXAMPLE 6

The brazing fin materials prepared in Example 3 were formed into corrugated fins and jointed to extruded tubes "a" to "d" (without Zn coating), as shown in Table 8, by brazing using a fluoride flux to prepare test samples (Sample Nos. B17 to B32), as shown in FIGS. 1(A) and 1(B). Each of the samples thus prepared was subjected to a four-week SWAAT test (ASTM G43) and examined for the maximum corrosion depth on the tube outer surface at the brazed portion of the tube and the fin, the corrosion-prevention distance (i.e., the shortest distance from the portion brazed to the fin to deeply corroded portion in the unbrazed portion of the tube) and the corrosion state of the fin. The results are set out in Table 9.

Sample Nos. B17 to B27 according to the present invention showed a small maximum corrosion depth and a long corrosion-prevention distance and the corrosion state of the fin did not cause any problem.

Comparative Sample No. B28 showed a large maximum corrosion depth and a short corrosion-prevention distance because the Zn content of the fin core material was low. No. B29 showed a considerable corrosion of the fin material because an excessive Zn was present in the fin core material. No. B30 showed a large maximum corrosion depth and a short corrosion-prevention distance because the Cu content of the fin core material was too high.

No. B31 showed a short corrosion-prevention distance because the Mn content was excessive.

No. B32 showed a short corrosion-prevention distance because the fin core material was made of AA 3003 alloy with Zn.

TABLE 8

| | Chemical Composition (wt %) | | | Zn Coating Amount (g/m$^2$) |
|---|---|---|---|---|
| | Al | Cu | Mn | |
| a | 99.6 | — | — | — |
| b | bal. | 0.45 | — | — |
| c | bal. | — | 0.46 | — |
| d | bal. | 0.20 | 0.10 | — |
| e | 99.6 | — | — | 12 |
| f | bal. | 0.10 | — | 15 |
| g | bal. | — | 0.20 | 22 |
| h | bal. | 0.40 | 0.15 | 6 |

TABLE 9

| Sample No. | Core Alloy of Fin | Extruded Tube | SWAAT TEST | | |
|---|---|---|---|---|---|
| | | | Maximum Corrosion Depth (mm) | Corrosion-Prevention Distance (mm) | Corrosion State of Fin* |
| B17 | A | a | 0.05 | 6 | c |
| B18 | A | b | 0.02 | 8 | c |
| B19 | A | c | 0.03 | 8 | o |
| B20 | A | d | 0.01 | 8 | c |
| B21 | B | b | 0.03 | 7 | c |
| B22 | C | d | 0.04 | 8 | c |
| B23 | D | a | 0.03 | 7 | c |
| B24 | E | a | 0.02 | 6 | o |
| B25 | E | b | 0.03 | 8 | c |
| B26 | E | c | 0.02 | 7 | c |
| B27 | E | d | 0.02 | 7 | o |
| B28 | H | d | 0.19 | 2 | c |
| B29 | I | d | 0.02 | 9 | x |
| B30 | K | d | 0.28 | 0 | c |
| B31 | O | d | 0.04 | 4 | c |
| B32 | P | d | 0.04 | 3 | o |

Remark:
Nos. B17–B27: Samples of Present Invention
Nos. B28–B32: Comparative Samples
* : No serious corrosion occurred.
x: Considerable corrosion occurred.

EXAMPLE 7

Figure 2:
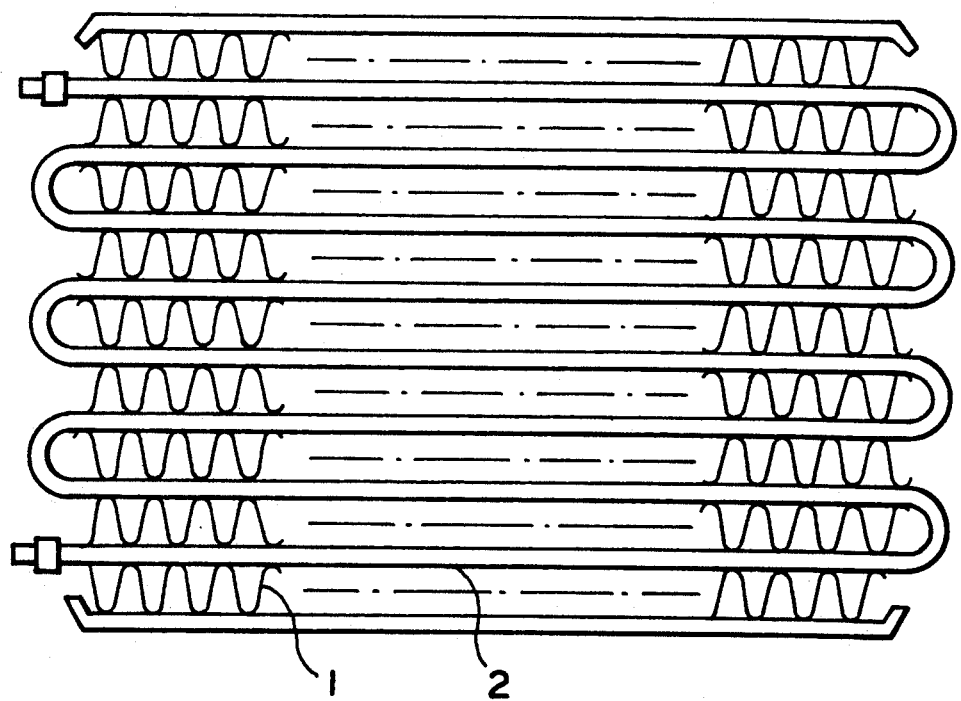
FIG. 2 is a front view of the test sample of a serpentine-type condenser.

The fin materials prepared in Example 3 were formed into corrugated fins and bonded to tubes "e" to "h", as shown in Table 3, by brazing employing a fluoride flux to assemble serpentine-type condensers (Sample Nos. B33 to B45), as shown in FIG. 2. In FIG. 2, the corrugated fins are represented by numeral 1 and they were arranged between the tube 2 which was bent to have a serpentine form.

Each condenser was subjected to a four-week CASS test (JIS D 0201) and a four-week salt spray corrosion test (JIS Z 2371) to examine the maximum corrosion depth on the tube outer surface, the corrosion state of the fin and the separation of the fin from the tube. The test results are shown in Table 10.

Sample Nos. B33 to B40 of the present invention showed small maximum corrosion depths and the corrosion state of the fin did not cause any serious problem. No separation occurred in the fin.

In Comparative Samples B41 to B45, their maximum corrosion depths were suppressed by using the Zn-coated tube. However, in Sample Nos. B41, B43, B44 and B45, separation of the fins from the tubes occurred and a considerable corrosion occurred in Sample No. B42.

TABLE 10

| Sample No. | Core Alloy of Fin | Extruded Tube | CASS Test | | Salt Spray Corrosion Test | | |
|---|---|---|---|---|---|---|---|
| | | | Maximum Corrosion Depth (mm) | Corrosion State of Fin* | Maximum Corrosion Depth (mm) | Corrosion State of Fin* | Separation of Fin |
| B33 | A | e | 0.07 | c | 0.04 | o | No separation |
| B34 | B | h | 0.05 | c | 0.03 | o | No separation |
| B35 | C | e | 0.07 | c | 0.03 | o | No separation |
| B36 | C | f | 0.06 | c | 0.03 | o | No separation |
| B37 | C | g | 0.05 | c | 0.02 | o | No separation |
| B38 | C | h | 0.06 | c | 0.04 | o | No separation |
| B39 | D | h | 0.06 | c | 0.03 | c | No separation |
| B40 | E | f | 0.07 | c | 0.02 | o | No separation |
| B41 | H | f | 0.06 | c | 0.03 | o | Separation |
| B42 | I | f | 0.05 | x | 0.02 | x | No separation |
| B43 | K | f | 0.07 | c | 0.04 | o | Separation |
| B44 | O | f | 0.07 | c | 0.04 | o | Separation |
| B45 | P | f | 0.06 | c | 0.04 | o | Separation |

Remark:
Nos. B33-B40: Samples of the Present Invention
Nos. B41-B45: Comparative Samples
*c: No serious corrosion occurred.
x: Considerable corrosion occurred.

EXAMPLE 8

Figure 3:
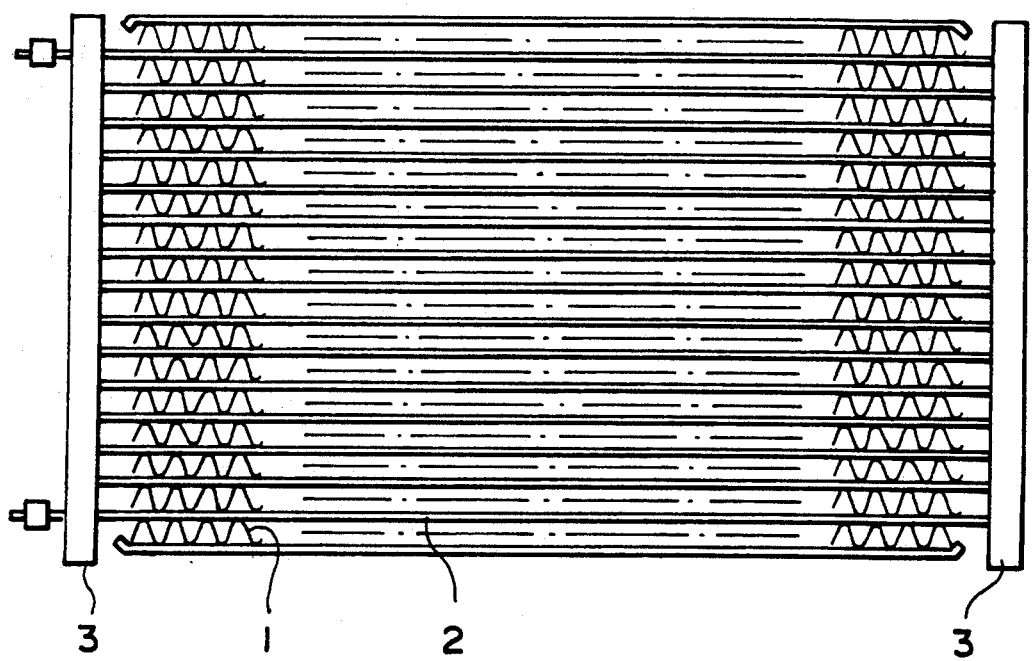
FIG. 3 is a front view of the test sample of a parallel-flow type condenser.

The fin materials prepared in Example 3 were formed into corrugated fins and combined with the extruded tubes "b" and "h", as shown in Table 3, to assemble parallel flow-type condensers (Sample Nos. B46-B 54), as shown in FIG. 3. In FIG. 3, the corrugated fins 1 were disposed between the tubes 2 which were arranged parallel to one another. Numeral 3 designates a header.

Each of the thus assembled condensers was incorporated into an air conditioner system and tested for its heat transfer efficiency. The results are shown in Table 11.

Nos. B46 to B50 of the present invention showed an increased heat transfer efficiency as compared with Comparative Sample No. B54, which was prepared from a conventional fin and tube combination.

Comparative Samples Nos. B51, B52 and B53 showed heat transfer properties equivalent to that of No. B54 because the fin materials used in these samples had a low thermal conductivity.

TABLE 11

| Sample No. | Core Alloy of Fin | Extruded Tube | Augmentation in Heat Transfer Rate* |
|---|---|---|---|
| B46 | A | b | 3 |
| B47 | B | b | 4 |
| B48 | C | h | 3 |
| B49 | D | h | 2 |
| B50 | E | h | 3 |
| B51 | M | h | 0 |
| B52 | N | h | 0 |
| B53 | O | h | 0 |
| B54 | P | h | 0 |

Remark:
Nos. B46-B50: Samples of the Present Invention
Nos. B51-B54: Comparative Samples
*Augmentation (%) in heat transfer rate is shown based on the rate of heat transfer of Comparative Sample No. B54.

The present invention can provide superior fin materials which have superior thermal conductivity and sacrificial anode effect, especially in combination with Zn-coated tubes, even after being subjected to a brazing operation. Due to such advantageous properties, the thickness of the fin material can be significantly reduced. Also, such improved fin materials can provide heat exchangers having superior corrosion resistance and superior heat transferring ability and makes great contributions to the reliability, miniaturization and weight-reduction of heat exchangers.

What is claimed is:

1. An aluminum alloy fin material for use in an aluminum heat exchanger, which consists of, in weight percentage, 0.8 to 1.8% Fe, 0.3 to 3.0% Zn, up to 0.3% Cu and at least one element selected from the group consisting of 0.05 to 0.25% Zr and 0.05 to 0.25% Cr, with the balance being Al and unavoidable impurities, wherein Mn in the unavoidable impurities is 0.3% or less.

2. A brazing fin material for use in an aluminum heat exchanger, which consists of an aluminum alloy core consisting of, in weight percentage, 0.8 to 1.8% Fe, 0.3 to 3.0% Zn, up to 0.3% Cu and at least one element selected from the group consisting of 0.05 to 0.25% Zr and 0.05 to 0.25% Cr, with the balance being Al and unavoidable impurities, wherein Mn in the unavoidable impurities is 0.3% or less; and a cladding consisting of an Al-Si alloy brazing material and clad onto both sides of the core.

3. A heat exchanger which comprises:
(i) a fin member made of an aluminum alloy consisting of, in weight percentage, 0.8 to 1.8% Fe, 0.3 to 3.0% Zn, up to 0.3% Cu and at least one element selected from the group consisting of 0.05 to 0.25% Zr and 0.05 to 0.25% Cr, with the balance being Al and unavoidable impurities, wherein Mn in the unavoidable impurities is 0.3% or less; and
(ii) a fluid passage member made of a brazing sheet consisting of an aluminum alloy core and a cladding made of an Al-Si brazing alloy and bonded onto one side or both sides of the core, wherein the fin member is brazed to the fluid passage member.

4. A heat exchanger which comprises:
(i) a fin member made of a brazing sheet consisting of an aluminum alloy core and a cladding made of an Al-Si brazing alloy and bonded onto both sides of the core, the aluminum alloy core consisting of, in weight percentage, 0.8 to 1.8% Fe, 0.3 to 3.0% Zn and up to 0.3% Cu and at least one element selected from the group consisting of 0.05 to 0.25% Zr and 0.05 to 0.25% Cr, with the balance being essentially Al and unavoidable impurities, wherein Mn in the unavoidable impurities is 0.3% or less; and (ii) a fluid passage member made of an extruded tube consisting of an aluminum having an aluminum purity of 99% or more, wherein the fin member is brazed to the fluid passage member.

5. A heat exchanger which comprises:

(i) a fin member made of a brazing sheet consisting of an aluminum alloy core and a cladding made of an Al-Si brazing alloy and bonded onto both sides of the core, the aluminum alloy core consisting of, in weight percentage, 0.8 to 1.8% Fe, 0.3 to 3.0% Zn and up to 0.3% Cu and at least one element selected from the group consisting of 0.05 to 0.25% Zr and 0.05 to 0.25% Cr, with the balance being essentially Al and unavoidable impurities, wherein Mn in the unavoidable impurities is 0.3% or less; and (ii) a fluid passage member made of an extruded tube consisting of an aluminum alloy consisting of at least one element selected from the group consisting of not more than 0.5% Cu and not more than 0.5% Mn, with the balance being essentially Al and unavoidable impurities, wherein the fin member is brazed to the fluid passage member.

6. A heat exchanger as claimed in claim 4 in which the extruded tube has a Zn coating layer of 1 to 25 g/m$^2$ on the surface thereof.

7. A heat exchanger as claimed in claim 5 in which the extruded tube has a Zn coating layer of 1 to 25 g/m$^2$ on the surface thereof.

* * * * *